Oct. 9, 1962     H. P. DEMING     3,058,018
ELECTRO-MECHANICAL DRIVE
Filed May 14, 1959     2 Sheets-Sheet 1

INVENTOR.
HERSCHEL P. DEMING
BY
Anderson, Spangler & Wymore
ATTORNEYS

Oct. 9, 1962   H. P. DEMING   3,058,018
ELECTRO-MECHANICAL DRIVE
Filed May 14, 1959   2 Sheets-Sheet 2
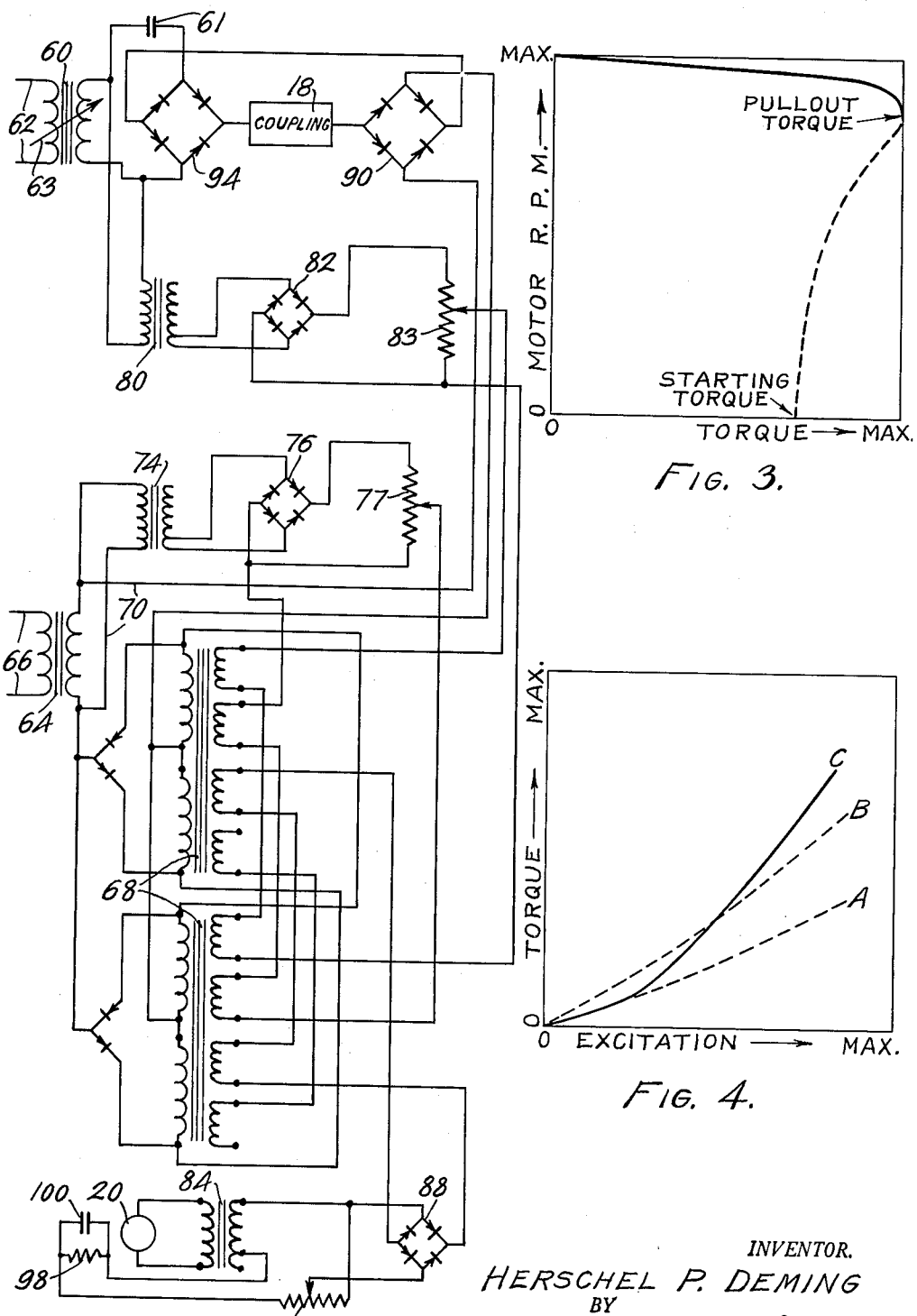
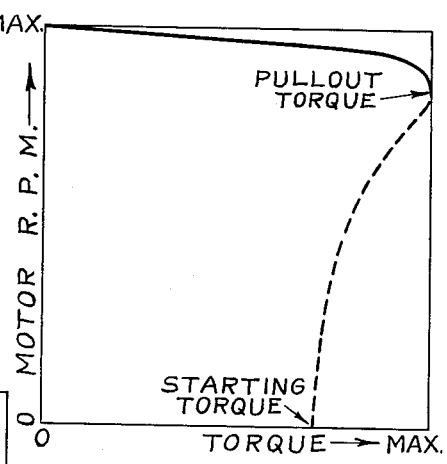
FIG. 3.
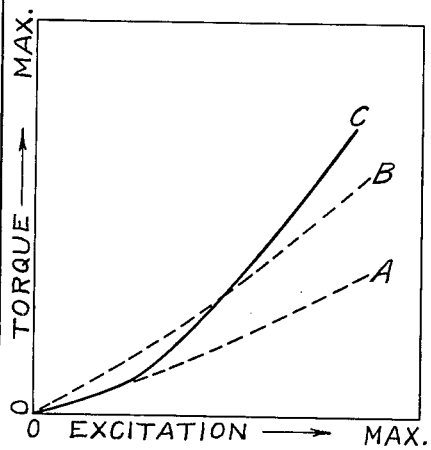
FIG. 4.
FIG. 2.
INVENTOR.
HERSCHEL P. DEMING
BY
Anderson, Spangler & Wymore
ATTORNEYS

United States Patent Office 3,058,018
Patented Oct. 9, 1962

3,058,018
ELECTRO-MECHANICAL DRIVE
Herschel P. Deming, Denver, Colo., assignor to Stearns-Roger Manufacturing Company, Denver, Colo., a corporation of Colorado
Filed May 14, 1959, Ser. No. 813,197
9 Claims. (Cl. 310—95)

This invention is directed to an improved electro-mechanical drive and, more particularly, to an electro-mechanical drive adapted to provide optimum control especially where the speed of the driven load is required to be varied.

It is an important object of the present invention to provide an improved electro-mechanical drive which may be utilized to advantage with many and various types of power drive units and is not limited to use with electric motors as are most prior art drives.

A further important object of this invention is to provide an improved electro-mechanical drive wherein the speed of the power drive unit need not be varied to obtain variable speed of the driven load.

Another important object of this invention is to provide an improved electro-mechanical drive with which multi-speed power drive units may be used to advantage.

Another object of this invention is to provide an improved electro-mechanical drive which can be used with relatively inexpensive power drive units to achieve comparable or better results than are presently available with drives requiring variable speed prime movers.

Another object of this invention is to provide an improved electro-mechanical drive with which speed control of the driven load may be obtained by coarse steps, fine steps or stepless control as conditions of economy and convenience demands.

Another object of this invention is to provide an improved electro-mechanical drive which permits close speed regulation of the driven load over a wide range of speeds.

Another object of this invention is to provide an improved electro-mechanical drive which will apply a starting torque to a driven load nearly equal to the pull-out torque of the power drive unit to overcome the breakaway torque of the load.

Another and further object of this invention is to provide an improved electro-mechanical drive particularly well suited to automation wherein the speed of a driven load must follow a predetermined pattern.

A still further object of this invention is to provide an improved electro-mechanical drive wherein the number of heavy current contacts is drastically reduced or eliminated by the use of less expensive and longer lived static controls.

Yet another object of this invention is to provide an improved electro-mechanical drive wherein all primary control devices are small in size and power requirements, are easily manipulated by hand and may be readily incorporated into electrical circuits for automation purposes.

Still another object of this invention is to provide an improved electro-mechanical drive wherein the speed of the driven load may be controlled over a wide range and the speed thereof will remain substantially constant under varying conditions of load.

In accordance with the invention, the improved electro-mechanical drive includes in combination with a power drive unit, variable coupling means responsive to an electrical control signal coupling the power drive unit to a driven load and control means adapted to develop control signals to automatically vary the coupling between the power drive unit and the driven load to maintain the speed of the driven load substantially constant. The coupling includes a driving element and a driven element wherein the effective coupling therebetween is responsive to an excitation signal. The control means includes variable current means connected to a source of current adapted to develop a variable output, an amplifier having at least one input and an output, means biasing the amplifier for substantially zero output with zero input, means connecting the output of the variable current means to an input of the amplifier and means connecting the amplifier output to the coupling means. The control means further includes means operatively connected to the driven element of the coupling adapted to develop an output signal representative of the speed thereof and means connecting the developed signal to another input of the amplifier. The variable current means further includes a pair of contacts operatively connected to close at a predetermined current output therefrom and connect the output of the variable current means directly to the coupling.

For a better understanding of the present invention, together with other and further objects thereof, reference is had to the following description taken in connection with the accompanying drawings and its scope will be pointed out in the appended claims.

In the drawings:

FIGURE 2 is a diagrammatic representation of the control circuits of the improved electro-mechanical drive of this invention;

FIGURE 3 is a graphical representation of the available torque of the improved electro-mechanical drive of this invention; and FIGURE 4 is a graphical representation of the torque v. control excitation of the improved electro-mechanical drive of this invention.

Figure 1:
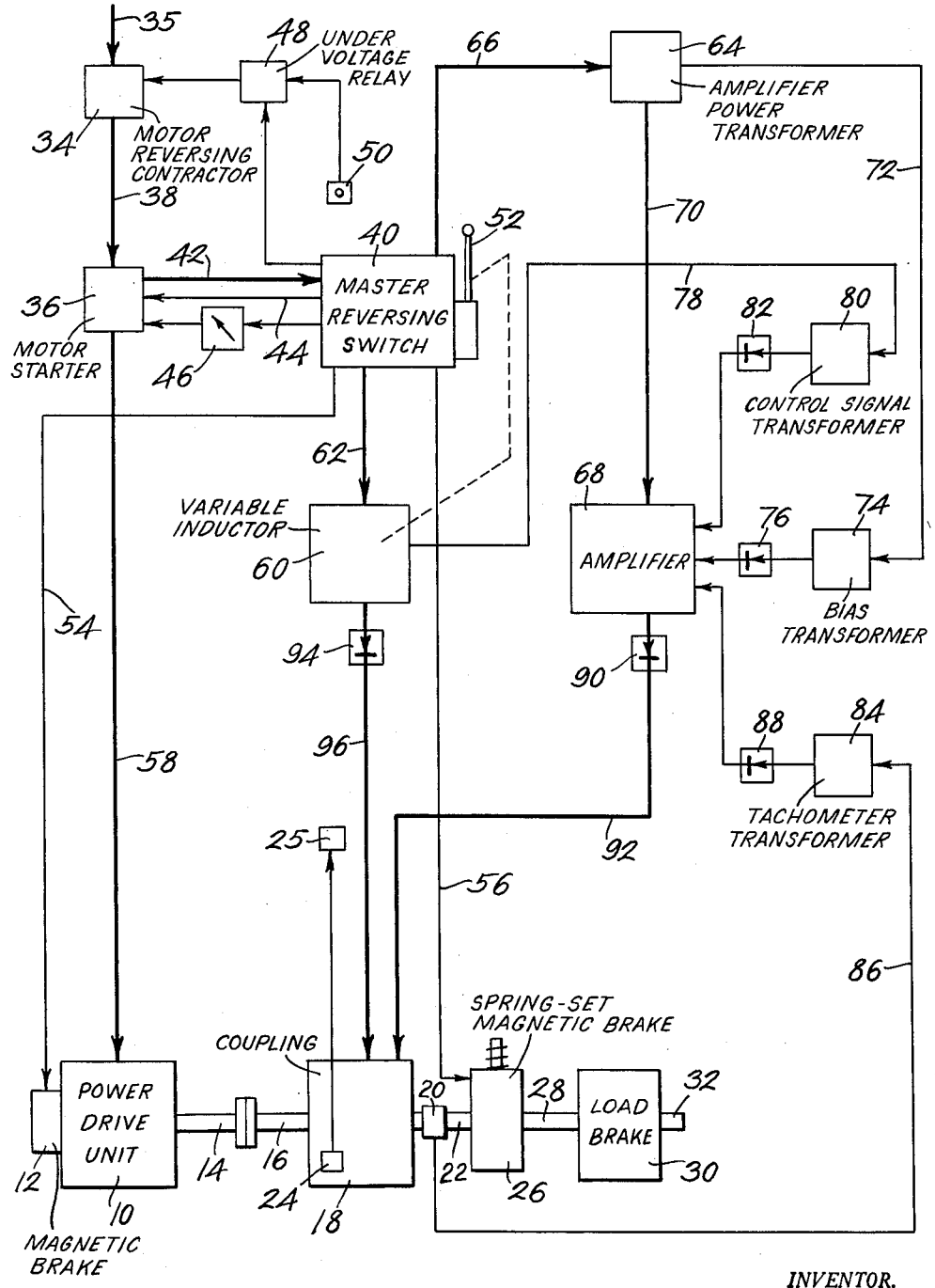
FIGURE 1 is a diagrammatic representation of an electro-mechanical drive system embodying the present invention.

While the invention will be described using an electric motor as the power drive unit it will be readily understood by those skilled in the art that the present invention may be used to advantage with various types of power drive units including, a steam engine, internal combustion engine, turbine, water wheel, wind mill and the like.

Referring to FIGURE 1 there is shown diagrammatically a complete drive system embodying the improved electro-mechanical drive of this invention. A power drive unit 10, as shown, consists of a squirrel cage induction electric motor capable of running in either direction and may conveniently be of a plural speed type. A disc type magnetic brake 12 is mounted on one end of motor shaft 14 and is adapted to bring the motor shaft to a quick stop when the motor is reversed. The other end of shaft 14 is mechanically coupled to the input shaft 16 of an eddy current magnetic coupling 18. A tachometer generator 20 is operatively coupled to the output shaft 22 of coupling 18 and a thermally actuated switch 24 is mounted on coupling 18 and connected to alarm device 25. Output shaft 22 of coupling 18 carries a brake drum for a spring-set magnetic brake 26 and shaft 22 is mechanically coupled to the input shaft 28 of a self-locking mechanical load brake 30. The output shaft 32 of load brake 30 drives the rope drum of a hoist (not shown) through a suitable gear train.

The electrical control system for controlling the speed of output shaft 22 of coupling 18 comprises a motor reversing contactor 34 connected to a source of electrical power 35 and feeding a motor starter 36 which may conveniently be a plural speed type through conductor 38. Motor starter 36 feeds power to master reversing switch 40 via conductor 42. Motor starter 36 is controlled by master reversing switch 40 through conductor 44 and the motor speed is selected by means of motor speed selector 46 where power drive unit 10 is of the plural speed type. Master switch 40 is further connected to motor reversing contactor 34 through an under-voltage relay 48 to which is connected emergency stop switch 50. When the control arm 52 of master switch 40 is in the center or stop position current is transmitted through conductors 54 and 56 to brakes 12 and 26, respectively, to bring shaft 14 of motor 10 to a stop and to stop output shaft 22 of coupling 18. Under the control of master switch 40, current is supplied to motor 10 from motor starter 36 via conductor 58 when arm 52 is moved from stop position and the direction of rotation of shaft 14 of motor 10 depending on the direction of movement of arm 52. Power is supplied from master switch 40 to a variable inductor 60 via conductor 62. The control element of variable inductor 60 is mechanically connected to control arm 52 of master switch 40. Power is further fed from master switch 40 to amplifier power transformer 64 via conductor 66. It is to be understood that power is supplied to conductors 58, 62 and 66 when arm 52 is moved from stop position and power is supplied to conductors 54 and 56 when arm 52 is in stop position. Power transformer 64 feeds power to amplifier 68 via conductor 70. A bias signal is supplied by power transformer 64 via conductor 72 to bias transformer 74 which is connected to an input of amplifier 68 through rectifier 76. A control signal is supplied from variable inductor 60 via conductor 78 to transformer 80 to another input of amplifier 68 through rectifier 82. The magnitude of this control signal being determined by the positioning of the variable inductance control element as determined by arm 52. Another control signal is generated by tachometer 20 whose output is connected to transformer 84 via conductor 86 and to still another input of amplifier 68 through rectifier 88. The magnitude of this control signal being dependent upon the speed of output shaft 22 of coupling 18. The output of amplifier 68 is connected through rectifier 90 and conductor 92 to coupling 18 to supply excitation current thereto. Additional excitation current is supplied to coupling 18 from variable inductor 60 through rectifier 94 via conductor 96, this current being supplied when the arm 52 of master switch 40 is near the end of travel to either side of stop position whereupon a pair of normally open switch contacts are closed connecting the output of variable inductor directly to rectifier 94.

Referring now to FIGURE 2 wherein the control circuit is shown in greater detail, the primary of variable inductor 60 is supplied with current from master switch 40, FIGURE 1, via conductors 62. Depending upon the positioning of control element 63 an induced signal appears on the secondary and is applied to the primary of transformer 80. A portion of the secondary of transformer 80 is connected to a full-wave bridge rectifier 82, the output of which is connected across the resistance element of potentiometer 83. The sliding tap of potentiometer and one end of the resistance element are connected to an end, respectively, of a control winding of self-saturating magnetic amplifier 68. Power for amplifier 68 is supplied by transformer 64 through conductors 70, the transformer being connected to a source of current by means of conductors 66. Power is also supplied from transformer 64 to the pirmary of bias transformer 74. A portion of the secondary of transformer 74 is connected to full-wave bridge rectifier 76, the output of which is connected across the resistance element of potentiometer 77. The sliding tap and one end of the resistance element are connected respectively to an end of yet another control winding of amplifier 68. Tachometer generator 20 is connected to the primary of transformer 84. The secondary of transformer 84 is connected across the resistance element of potentiometer 85 in series with resistance 98 having shorting switch 100 connected thereacross. Resistor 98 and switch 100 are used where a plural speed prime mover 10 is used. Switch 100 is operatively connected to open on changing from a low to a higher speed as by actuation of motor speed switch 46, FIG. 1. The sliding tap of potentiometer 85 and one end of the resistance element are respectively connected into full-wave bridge rectifier 88, the output of which is connected to still another control winding of amplifier 68.

In operation, the speed of motor 10 is selected by the position of speed selector 46 and arm 52 of the master switch 40 is moved to the first point in the desired direction of travel, whereupon circuits are switched to release brakes 12 and 26. Contactor 34 and starter switch 36 are closed to bring motor 10 up to full selected speed in the selected direction of rotation. Further movement of arm 52 of master switch 10 to the second point closes contacts to energize both the magnetic amplifier 68 and variable inductor 60. The magnetic amplifier now feeds direct current power to the excitation circuit of eddy current coupling 18 and the output shaft 22 thereof begins to rotate slowly due to the magnetic pull of the exciting field. The output of amplifier 68 and resulting torque of the eddy current coupling 18 is governed by three influences: first, the cut-off bias as provided by the feed transformer 64 through the bias transformer 74, normally the bias is adjusted by means of potentiometer 7 7to provide a zero output from the amplifier 68 with zero input thereto; second, the control excitation as fed from the output of the variable inductance 60 through the maximum excitation transformer 80; and third, the speed regulation feedback as provided by the tachometer generator 20 through speed regulating transformer 84. These three signals combine to control the output of magnetic amplifier 68 to automatically correct the amount of excitation supplied to coupling 18 to move the driven load at a constant minimum speed. Further movement of arm 52 closes contacts 61 to feed the rectified output of variable inductor 60 directly into the eddy current coupling 18, thus increasing the amount of excitation. Still further movement of arm 52 causes a gradual coarse stepless increase in the amount of excitation through variable inductor 60 and a resulting increase of speed of the driven load. An important aspect of the present invention is that the increasing output voltage of variable inductor 60 comprising the coarse control feeds directly to the coupling excitation circuit and the fine control resulting from a control winding of amplifier 68 provides for incremental changes in excitation power. This provides a substantially constant regulated speed of the drive output for any position of arm 52 regardless of the amount of load on the drive.

The foregoing description illustrates one use of the present invention as applied to a hoist and the like to provide an equally smooth and flexible drive as that available with the more expensive and complicated drives presently in use.

It will be readily understood that where adequate utility power is unavailable, a gasoline or diesel engine may be used with the present invention and can be coupled directly into the eddy current coupling to provide a variable speed drive system, eliminating the motor generator sets required in other types of systems and providing an improved drive unattainable with present systems. It is extremely difficult, as in present systems, to vary the speed of the power drive unit and maintain any reasonable degree of control of the speed of the driven load with varying torque requirements. The present invention is not dependent for its high degree of control on the speed of the power drive unit being constant. With the present invention, an inexpensive squirrel-cage induction motor replaces direct-current motors, wound-rotor motors and variable drive motors of prior art drives with improved results and elimination of costly secondary resistors and heavy-duty accelerating contactors.

Where close speed regulation is imperative, it is not necessary with this invention to apply braking to reduce motor speed to control speed at light loads as in prior art drives. In some instances where the power drive unit is an electric motor and the motor starts under load, the starting torque may be insufficient to start the load, stalling the motor. With the present invention, with the motor running at full speed before the load is applied, torque up to the pull-out torque of the motor is available to start the load. The pull-out torque is substantially greater than starting torque as shown diagrammatically in FIGURE 3 of the drawing. The motor torque instantly available with the improved drive is shown by the solid portion of the curve, while the dotted portion illustrates the torque available with prior art drives.

Referring to FIGURE 4, there is shown a plot of the torque available from the drive of this invention versus excitation current supplied to coupling 18. Dotted curve A represents the fine control torque curve resulting from the output of amplifier 68. Dotted curve B represents the coarse control torque curve resulting from direct excitation of coupling 18 by variable inductor 60 through contacts 61 and rectifier 94. Solid curve C represents the torque curve available with the drive of the present invention resulting from a combination pattern of the torque curves A and B with a delay in the application of coarse control direct excitation.

While there has been described what at present is considered to be the preferred embodiment of this invention, it will be obvious to those skilled in the art that various changes and modifications may be made therein without departure from the invention. It is aimed, therefore, in the appended claims to cover all such changes which fall within the true spirit and scope of the invention.

What is claimed is:

1. An improved electro-mechanical drive comprising in combination: a power drive unit; variable coupling means responsive to an electrical control signal operatively coupling the power drive unit to a driven load; and, a control means adapted to develop control excitation to automatically vary the amount of coupling between the power drive unit and the load to maintain the speed of the driven load at a preselected substantially constant speed even under varying load conditions wherein the control means includes a first control circuit adapted to develop a fine stepless increase in the control excitation on demand to vary the amount of coupling and a second control circuit adapted to supply a selected coarse increase in the control excitation concurrently with the fine control excitation over a predetermined portion of the first circuit control range.

2. An improved electro-mechanical drive according to claim 1, wherein the coupling means includes a driving element and a drive element, the amount of coupling therebetween being responsive to the magnitude of a control signal and the control means includes variable current means connected to a source of electrical current and adapted to develop a variable output, an amplifier having at least one input and an output, means biasing the amplifier for substantially zero output with zero input, means connecting the output of the variable current means to an input of the amplifier and means connecting the output of said amplifier to said coupling means.

3. An improved electro-mechanical drive according to claim 2 including contact means operatively connected to the variable current means and adapted to close at a preselected setting thereof to connect the output of said variable current means directly to said coupling means.

4. An improved electro-mechanical drive according to claim 3 wherein the control means further includes means operatively connected to the driven element of said coupling adapted to develop an output signal representative of the speed of said driven element and means connecting the developed output to an input of said amplifier.

5. An improved electro-mechanical drive comprising in combination: a reversible power drive unit having an output shaft; variable coupling means responsive to an electrical control signal operatively coupling the output shaft of the power drive unit to a driven load; brake means adapted on actuation to provide braking action of said output shaft; and a control means controlling the direction of rotation of said drive unit adapted to develop control excitation to automatically vary the amount of coupling between the power drive unit and the load to maintain the speed of the driven load at a preselected substantially constant speed even under varying load conditions wherein the control means includes a first control circuit adapted to develop a fine stepless increase in the control excitation on demand to vary the amount of coupling and a second control circuit adapted to supply a selected coarse increase in the control excitation concurrently with the fine control excitation over a predetermined portion of the first control circuit range, said control further including circuit means adapted to actuate said brake means just prior to reversal of the drive unit and to release said brake means on reversal of the drive unit.

6. An improved electro-mechanical drive according to claim 5, wherein the control means includes a variable current means connected to a source of electrical current and adapted to develop a variable output, an amplifier having at least one input and an output, means biasing the amplifier for substantially zero output with zero input, means connecting the output of the variable current means to an input of said amplifier and means connecting the output of said amplifier to said coupling means.

7. An improved electro-mechanical drive according to claim 6 including contact means operatively connected to the variable current means and adapted to close at a preselected setting thereof to connect the output of said variable current means directly to said coupling means.

8. An improved electro-mechanical drive according to claim 7 wherein the control means further includes generator means operatively connected to the driven element and responsive to the speed thereof to develop an output signal and means connecting the developed output signal to an input of said amplifier.

9. An improved electro-mechanical drive in accordance with claim 8, wherein the power drive unit is a plural speed type, a speed control means for selecting the speed of said power drive unit, at least one pair of contacts operatively connected to be closed at selected positions of said speed selector, the generator means having a load resistance connected across the output and said contacts each being connected across a portion of said load resistance to shunt such portion and reduce the amount of output signal developed at high speeds supplied to an amplifier input.

References Cited in the file of this patent

UNITED STATES PATENTS

| | | |
|---|---|---|
| 2,214,807 | Buckley | Sept. 17, 1940 |
| 2,512,017 | Hayes | June 20, 1950 |
| 2,697,794 | Jaeschke | Dec. 21, 1954 |
| 2,714,917 | Siegerist | Aug. 9, 1955 |
| 2,744,213 | Jaeschke | May 1, 1956 |
| 2,806,157 | Dustman | Sept. 10, 1957 |